Dec. 26, 1939.  J. SAND  2,184,472
EAR CORN TEST PROBE
Filed Dec. 17, 1937
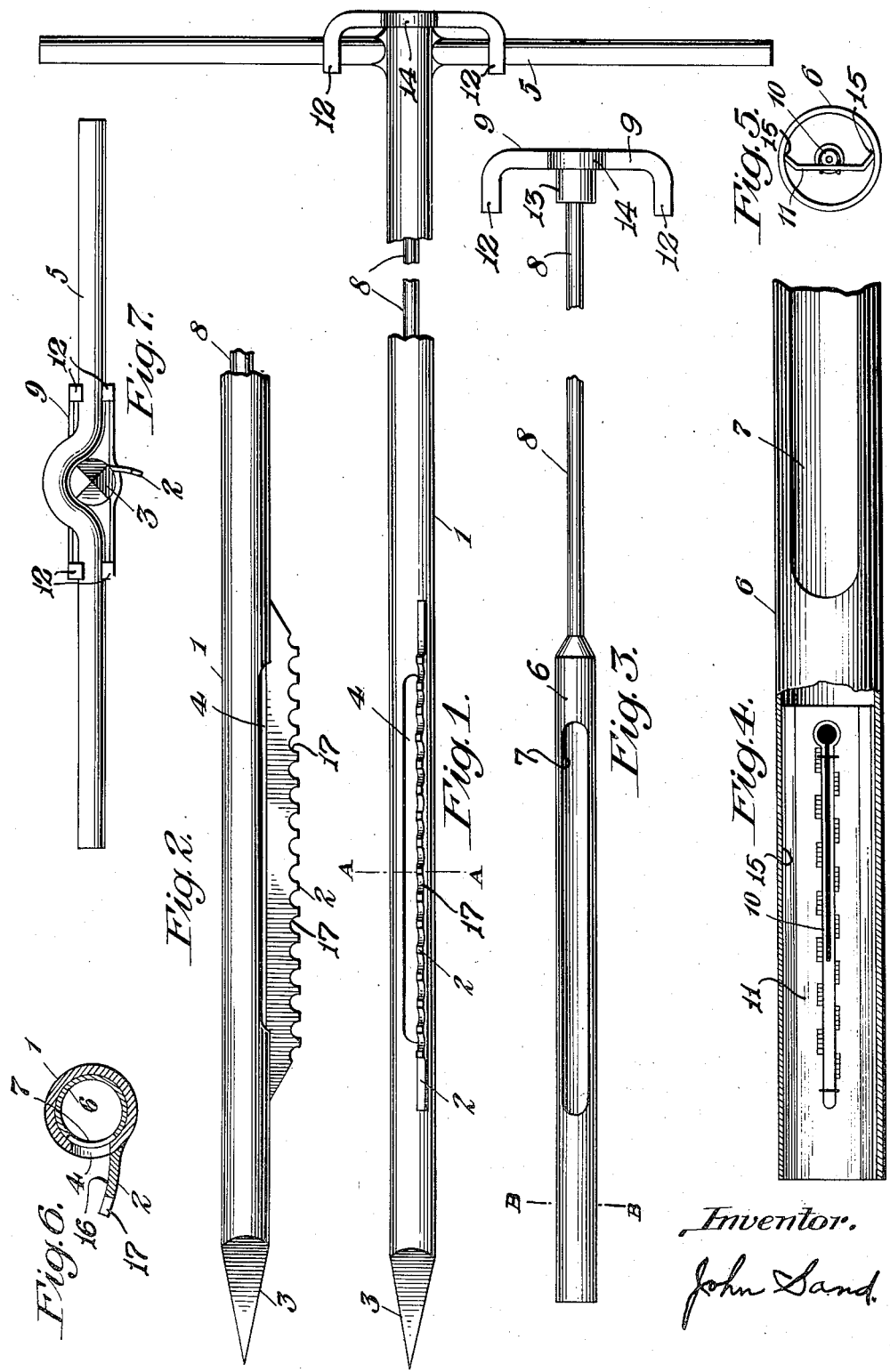
Inventor.
John Sand.

Patented Dec. 26, 1939

2,184,472

UNITED STATES PATENT OFFICE 2,184,472

EAR CORN TEST PROBE

John Sand, Marcus, Iowa

Application December 17, 1937, Serial No. 180,279

8 Claims. (Cl. 83—15)

My invention relates to that class of equipment that is used in connection with the testing of ear corn in bulk stored in crib or bin.

The salient object of the invention is to provide a simple, convenient and speedy means for procuring a sample of shelled corn from a bulk of ear corn stored within a bin or crib at any desired point therein, and preferably also to procure a thermometer reading of the prevailing temperature within said stored bulk at the same point or any other point desired. For the purpose of ascertaining state of preservation of said corn and to procure a true representative sample of shelled corn taken from various places within a bulk of ear corn stored in crib or other places from which to make a moisture content and quality grade test of said ear corn, as required by the Government in making ear corn sealing loans and to establish grades upon which market quotations apply.

I have provided an outer metal tube which is sharpened to a square point at one end and has a crossbar handle rigidly attached adjacent to its other end, said outer tube being provided with a longitudinal opening of some length near its point. Adjacent to said opening and parallel therewith is rigidly attached in an upstanding position a corn shelling rake having a serrated edge and concave form. Within said outer tube, there is provided a lighter and shorter inner metal tube having an opening that registers with opening in outer tbe. At one end of and within this inner tube, there is mounted a thermometer and to its other end there is attached a rod that extends to the outer end of outer tube and terminates in a T handle. These parts will be set out more fully in the following detailed description, reference being had to the accompanying drawing, in which:

Fig. 1 is a plan view of the probe, parts thereof being broken away,

Fig. 2 is a side view of the probe, parts thereof being broken away,

Fig. 3 is a plan view of the rotating gate,

Fig. 4 is an enlarged fragmentary view of the rotating gate, parts thereof being broken away, Fig. 5 is an enlarged sectional view taken on line B—B of Figure 3, Fig. 6 is a sectional view taken on line A—A of Figure 1, and Fig. 7 is an end view of the test probe.

Referring to Figure 1 the numeral 1 designates the hollow tubular member which forms the outer casing of the probe. The casing 1 is provided with a longitudinal opening 4 and is tapered at one end to provide a point 3 which is preferably square in cross section. The particular cross sectional shape of the point 3, while preferably square, may be of some other shape so long as it is non-circular, for a reason to be particularly described. A corn shelling rake 2 is carried by the casing 1 parallel to the opening 4, and the purpose and specific structure of the rake will be pointed out in detail later. A crossbar handle 5 is secured to the end of the shell or casing 1 remote from the point 3.

Referring to Figure 3 the numeral 6 designates a tubular gate or receptacle which is both slidable and rotatable in the casing 1. The gate 6 is provided with an opening 7 which may be brought into registration with the opening 4, as shown in Figure 6, by rotating the gate in a manner to be described. The gate is connected by a rod 8 to a T handle 9 which is provided with a plurality of resilient lugs 12 extending radially with respect to the handle 9 for engagement with the crossbar handle 5 in a manner and for a purpose to be described.

The rod 8, which obviously is of substantially smaller diameter than the gate 6, is provided with a collar 13 of the same external diameter as the gate 6 and which is adapted to fit within the adjacent end of the casing 1. An abutment 14 is formed at the outer end of the collar 13 for the purpose of limiting inward movement of the gate 6 and its associated parts with respect to the casing 1.

In properly testing ear corn in a crib or the like it is essential that the temperature of the corn be determined to assist in determining the condition of the corn. The present device provides means whereby specimens of the corn may be secured simultaneously with the taking of the temperature of the corn. Referring to Figures 4 and 5, it will be noted that the thermometer 10 is secured to a metal spring back 11, the edges 15 of which frictionally engage the interior surfaces of the gate 6 to hold the thermometer 10 in position. The corn shelling rake 2, which is mounted adjacent and parallel to the opening 7, is formed to provide a curved or convex surface 16 for the purpose of guiding and directing kernels of corn to and through the openings 4 and 7 when the latter are in registration. The rake 2 is further formed with a plurality of notches 17 to provide a serrated edge, and this structure plays an important part in the operation of the device for securing a sample of corn from the interior of a crib or the like, as will become apparent.

With the various parts of the invention constructed and assembled as shown in the accompanying drawing and set out by explanation in the foregoing specifications, it is now my purpose to explain its operative action and advantages obtained thereby.

It is frequently necessary to ascertain the true quality and condition of a bulk of ear corn stored in a crib, and this can be accomplished with prior constructions only with great difficulty, if at all. With this test probe it is now possible to obtain a sample of shelled corn from any place within a bulk of stored ear corn to be tested and to ascertain the prevailing temperature at any desired point within said bulk. This is accomplished in a comparatively short time and without any damage to crib whatever. In operating the test probe the opening 4 in stem 1 is closed by turning rotating gate 6 so that its opening is on opposite side from opening in stem 1, this is accomplished by a half turn of gate rod T handle 9 while the lugs 12 are disengaged from the handle 5, the rod 9 obviously being axially movable to permit engagement and disengagement between the lugs 12 and handle 5 to take place. With the gate 6 closed the test probe is entered through opening between crib boards into the bulk of ear corn at any desired angle, preferably an upward angle, and is forced inwardly to the point desired by a rocking pressure on crossbar handle 5. With probe in this position with the opening in stem 1 at upper side, the gate is then opened and with a slight rocking motion on crossbar handle while moving the test probe slightly in or out the shelling rake 2 contacts different ears of corn and in this way a sample of shelled corn from several different ears is deposited thru the opening in stem 1 within the rotating gate 6. Should it be desirable to procure a larger sample than the once filling of the gate 6 affords, said gate may be drawn out and the contents emptied and the operation repeated. In this connection attention is invited to the fact that the gate 6 is not only rotatable in the casing but is axially slidable therein and is capable of being completely withdrawn from the casing 1 when desired, for example, when it is desirable to secure more than one specimen of the corn. A specimen having been withdrawn in the gate and emptied therefrom, the gate may be reinserted in the casing 1 and moved axially therein to its normal position. It will be obvious, of course, that to obtain a representative sample for a true test of the whole bulk of stored ear corn being tested, the probe will be entered and samples taken from various points within said bulk. It will also be understood that by reason of the thermometer 10 within the rotating gate 6, the prevailing temperature at the point where the sample is procured can be ascertained at the same time and by the same operation.

The foregoing description covers the general operation of the device but attention is invited to several particular features of the construction and operation of the device. It will be noted that the pointed end 3 is square in cross-section and its construction is highly desirable over the use of a conical pointed end. The present device is particularly designed for use in obtaining samples from ear corn stored in cribs, bins and the like and it is frequently impossible, with a conical pointed end, to insert the probe to the desired depth. With the present device, the pointed end may be pushed into the corn as far as possible, and if an insufficient depth has been reached, the operator may grasp the end portions of the handle 5 and rock the device back and forth while pushing thereagainst. The non-circular shape of the pointed end 3 causes such end to provide a cam action forcing the corn away from the pointed end, thus permitting the probe to be entered to a substantially greater depth. In actual practice, therefore, the use of a non-circular entering point is essential in a large proportion of the times that the probe is used.

Attention is also particularly invited to the structure of the rake 2. This rake is rigid with the casing 1 which, in turn, is rigid with the handle 5. Therefore, it will be apparent that after the probe has been inserted to the desired depth in the body of the corn in the crib or the like, the operator may rock the handle 5 back and forth and may also push and pull the handle to reciprocate the casing 1 through relatively short strokes. The notches of the serrated edge 17 of the rake, engaging the kernels of the corn on the cobs, will break the kernels loose. When the device is operated in the position referred to, namely, with the opening 7 turned upwardly, the dislodged kernels of corn will fall downwardly through the openings 4 and 7 into the interior of the gate 6, the opening 7 having been turned into registration with the opening 4 as stated above. Thus it will be apparent that the structure of the rake is such as to permit specimens to be quickly taken from the corn. The rocking and sliding action of the rake to dislodge the corn is possible only because the operator can impart such movement by the proper operation of the handle 5.

The gate 6 is freely slidable as well as rotatable in the casing 1 and the lugs 12 provide means for locking the gate 6 in its operative position with the opening 7 registering with the opening 4, or in its inoperative position with the opening 7 turned 180° from the opening 4. Assuming that the probe has been inserted in the corn with the opening 7 in its inoperative position, and the lugs 12 engaging the handle 5, it merely is necessary, when a specimen is to be taken, for the operator to pull outwardly on the T handle 9 to disengage the lugs 12 from the handle 5, whereupon the handle 9 may be rotated through 180° and then moved inwardly toward the handle 5 to reengage the lugs 12 with the handle 5 whereupon the specimen may be taken in the manner desired. After the specimen has been secured, the lugs 2 are again disengaged, the handle 99 rotated through 180°, and the lugs 12 are again reengaged with the handle 5.

The handle 9 thus serves to indicate to the operator when the gate has been turned to its operative or inoperative position, and the lugs 12 hold the gate in either of such positions. If only one specimen is to be obtained, the device may be operated in the manner stated and the probe then completely withdrawn. If two or more specimens are to be obtained, the casing 1 may be left in position in the body of the corn in the crib and the gate 6 may be withdrawn from the end of the casing 1, whereupon the specimen may be emptied from the gate and the latter replaced in operative position. One or more additional specimens may be obtained through the repeating of this procedure without the necessity for having to reinsert the casing 1 for each specimen.

The spring back 11 of the thermometer is slidable in the gate 6 and when the latter is removed from the casing 1 upon the taking of a specimen the operator may slide the thermometer from the end of the gate a sufficient distance to take a reading thereof. Thus by a single operation of the device the operator may secure the desired specimen to permit a physical examination thereof, and the temperature of the region from which the specimen has been taken may be readily determined.

From the foregoing description, taken in connection with the accompanying drawing, I believe the novel design and details of construction, as well as the manner of use and advantages of my invention will be readily apparent to those with a knowledge of the art to which it relates.

What I claim is:

1. A device of the character described comprising inner and outer casings each provided with an opening, said casings being constructed and arranged to partake of a given relative movement to move said openings into and out of registration, handle means carried by one end of said outer casing, and means for locking said casings against said given relative movement, said outer casing having a corn shelling rake rigidly fixed thereto along one edge of the opening therein.

2. A device of the character described comprising an elongated tubular casing having a longitudinal opening therein, an elongated tubular receptacle mounted in said casing and provided with a longitudinal opening, said receptacle being rotatable in said casing to move said openings into and out of registration, a crossbar handle carried by said casing, and a handle carried by said receptacle for effecting rotation thereof in said casing and provided with portions engageable with said first named handle upon relative axial movement of said receptacle and said casing to lock them against relative rotational movement.

3. A device of the character described comprising an elongated tubular casing having a longitudinal opening therein, an elongated tubular receptacle mounted in said casing and provided with a longitudinal opening, said receptacle being rotatable in said casing to move said openings into and out of registration, a crossbar handle carried by said casing, and a handle carried by said receptacle for effecting rotation thereof in said casing and provided with portions engageable with said first named handle upon relative axial movement of said receptacle and said casing to lock them against relative rotational movement, the end of said casing opposite its handle having a portion tapered to a point and of non-circular cross-sectional shape.

4. A device of the character described comprising an elongated casing pointed at one end and having a longitudinal opening therein, a handle secured to the other end of said casing, and a corn shelling rake rigidly fixed to said casing and projecting outwardly therefrom at one longitudinal edge of said opening.

5. A device of the character described comprising an elongated casing pointed at one end and having a longitudinal opening therein, a handle secured to the other end of said casing, a corn shelling rake rigidly fixed to said casing and projecting outwardly therefrom at one longitudinal edge of said opening, and means in said casing relatively movable with respect thereto to close said opening.

6. A device of the character described comprising an elongated casing pointed at one end and having a longitudinal opening therein, a handle secured to the other end of said casing, a corn shelling rake rigidly fixed to said casing and projecting outwardly therefrom at one longitudinal edge of said opening, a receptacle mounted in said casing, said receptacle and said casing being tubular whereby said receptacle is rotatable in said casing, said receptacle having an opening movable into and out of registration with the opening in said casing upon rotation of said receptacle, and means for locking said receptacle against rotation in said casing.

7. A device of the character described comprising an elongated casing pointed at one end and having a longitudinal opening therein, a handle secured to the other end of said casing, a corn shelling rake rigidly fixed to said casing and projecting outwardly therefrom at one longitudinal edge of said opening, a receptacle mounted in said casing, said receptacle and said casing being tubular whereby said receptacle is rotatable in said casing, said receptacle having an opening movable into and out of registration with the opening in said casing upon rotation of said receptacle, and means carried by said receptacle and having a portion projecting longitudinally thereof for engagement with said handle to fix said receptacle against rotation in said casing, said means being constructed and arranged to be releasable from said handle upon axial movement of said receptacle in one direction.

8. A device of the character described comprising an elongated tubular unitary casing having a longitudinal opening therein, said casing having one end pointed and the other end open, a tubular receptacle mounted in said casing and provided with a longitudinal opening, said receptacle being rotatable in said casing to move said openings into and out of registration, said casing and said receptacle being constructed and arranged whereby said receptacle may be freely withdrawn from the open end of said casing, a corn shelling rake rigidly fixed to said casing and projected therefrom adjacent one longitudinal edge of said opening, a handle structure rigidly secured to said casing adjacent and wholly inwardly of the open end thereof, and a manually operable device carried by said receptacle and connected thereto through the open end of said casing, said device being operable to effect axial movement of said receptacle in said casing and being engageable with said handle structure to prevent rotation of said receptacle in said casing.

JOHN SAND.